No. 779,752.  Patented January 10, 1905.

UNITED STATES PATENT OFFICE.

ROBERT WARNOCK, OF WESTBORO, MISSOURI.

PAINT AND PROCESS OF PRODUCING SAME.

SPECIFICATION forming part of Letters Patent No. 779,752, dated January 10, 1905.

Application filed April 30, 1904. Serial No. 205,778.

*To all whom it may concern:*

Be it known that I, ROBERT WARNOCK, a citizen of the United States, and a resident of Westboro, in the county of Atchison and State of Missouri, have invented a new and Improved Paint and Process of Producing the Same, of which the following is a full, clear, and exact description.

My invention relates to paint compositions, it being particularly adapted for the coating of trees to prevent access of animals and insects.

To this end my invention consists in the compounding of tar, oil, carbolic acid, and asafetida in substantially the proportions and manner hereinafter set forth.

The following ingredients are first mixed in a suitable receptacle in the proportions stated: pine-tar, two gallons; fish-oil, one gallon; crude carbolic acid, two ounces, and asafetida, two ounces. These are all heated together, they being boiled for two hours and stirred while boiling. They are then preferably run into a settling-tank and allowed to remain for at least twelve hours. A sediment separates out in the form of a crystalline substance, and the supernatant fluid is drawn off, furnishing the paint, which is then ready for use. It may be applied by means of a suitable brush, and trees are preferably coated with it from the roots or ground-line to the juncture of the first branches with the trunk.

It is an effectual preventive against the ravages of rabbits, mice, and borers, and such insects as canker-worms will not climb the trunks of trees to which it has been applied. It is impervious to water, is stable, and does not evaporate, and keeps the bark soft and smooth, and by preventing the formation of fungi promotes a healthy growth.

Having thus described my invention, I claim as new and desire to secure by Letters Patent—

1. The herein-described tree-paint, consisting of pine-tar, fish-oil sufficient to liquefy the tar to the proper degree for application, carbolic acid, and asafetida.

2. The herein-described composition, consisting of the following components in substantially the proportions stated: pine-tar, two gallons; fish-oil, one gallon; crude carbolic acid, two ounces, and asafetida, two ounces.

3. The process of producing paint, which consists in boiling together tar, oil, carbolic acid and asafetida, and separating resultant crystals and fluid product.

In testimony whereof I have signed my name to this specification in the presence of two subscribing witnesses.

ROBERT WARNOCK.

Witnesses:
 WILLIAM BENTLY,
 LEWIS McGINNIS.